United States Patent [19]
Lohry et al.

[11] Patent Number: 5,758,325
[45] Date of Patent: May 26, 1998

[54] ELECTRONIC VOTING SYSTEM THAT AUTOMATICALLY RETURNS TO PROPER OPERATING STATE AFTER POWER OUTAGE

[75] Inventors: Kermit Lohry, Boulder; Larry W. Sarner, Loveland; Alan R. Ross, Boulder, all of Colo.

[73] Assignee: Mark Voting Systems, Inc., Loveland, Colo.

[21] Appl. No.: 493,096

[22] Filed: Jun. 21, 1995

[51] Int. Cl.⁶ .................................................. G06F 17/30
[52] U.S. Cl. .................................................. 705/12
[58] Field of Search .................. 235/386, 57, 130 R; 395/212, 201, 186, 187, 371, 180, 182.04, 182.02

[56] References Cited

U.S. PATENT DOCUMENTS

| 4,641,240 | 2/1987 | Boram | 364/409 |
|---|---|---|---|
| 4,641,241 | 2/1987 | Boram | 364/409 |
| 4,774,665 | 9/1988 | Webb | 364/409 |
| 5,193,176 | 3/1993 | Brandin | 395/575 |
| 5,278,753 | 1/1994 | Graft, III | 364/549 |
| 5,412,727 | 5/1995 | Drexler | 380/24 |
| 5,495,532 | 2/1996 | Kilian | 380/30 |

*Primary Examiner*—Thomas G. Black
*Assistant Examiner*—Diane Mizrahi
*Attorney, Agent, or Firm*—Holme Roberts & Owen

[57] ABSTRACT

An electronic voting system (20) includes a central judges station (22) having a detachable flash memory cartridge (42) for use in storing election data. The data contents of the memory cartridge (42) are shadowed by identical storage in a separate flash memory module (74). The memory cartridge (42) is retained by a password-protected solenoid lock mechanism (44) to preserve the integrity of election results. The station (22) is networked to a plurality of voting booths (24 and 26) that provide ballot selections to the judges' station (22).

21 Claims, 8 Drawing Sheets

ELECTRONIC VOTING SYSTEM THAT AUTOMATICALLY RETURNS TO PROPER OPERATING STATE AFTER POWER OUTAGE

BACKGROUND OF THE INVENTION

1. Field of the Invention

The present invention pertains to the field of primary state machines and, more particularly, to a computer including a central processing unit that is capable of restoring itself to an active configuration that existed just prior to a power outage. Still more specifically, the state machine is utilized in an electronic voting system.

2. Description of the Prior Art

State of the art voting machines are electronically operated, and coupled with a central computer that performs many functions, e.g., the counting or accumulation of votes for a plurality of simultaneous elections, that formerly required significant time and manpower. The electronic systems provide greater speed and accuracy than were formerly attainable. The success of an election official depends upon the smoothness with which a given election proceeds. A constant source of concern among election officials is the chance of a freak power outage that could require a nonuniform extension of the balloting times, turn away voters, or lead to a loss of accumulated electronic voting data. Even if the accumulated voting tallies are not lost by a power interruption, significant time can be lost in reinitializing the electronic voting system for subsequent operations following a power outage. Among other things, system security requirements demand password protection and validation before the system is again ready for voting. Battery backups for these systems are sometimes impractical. The electricity demands of some precinct voting stations, which require electricity for lighting in addition to electricity for operating the voting system, can approximate the requirements of a small hospital. Furthermore, battery backups cannot be relied upon to operate the system for a sufficient period of time to overcome the duration of a random power outage.

U.S. Pat. No. 4,641,240 discloses an electronic voting machine and system that utilizes electrically erasable read only memory ("EEROM") and erasable programmable read only memory ("EPROM") in a detachable memory cartridge. The memory cartridge is provided with a fuse that is connected in series to the cartridge write enable line. The fuse is blown as a security measure to preclude further writing to the cartridge at the conclusion of voting. While the cartridge memory is nonvolatile, i.e., it will survive an interruption of power to the voting station, the system does not reinitialize to a primary state that existed immediately before the interruption of power.

U.S. Pat. No. 5,278,753 discloses an electronic voting system that utilizes an optical storage disk for storage of election results. The optical storage drive is a write-once-read-many ("WORM") drive that retains a copy of each ballot cast in an election. The disclosed voting system, once subjected to a power interruption, will not return to a primary state that existed immediately before the interruption of power.

There remains a need for a voting system that includes a judges' station that can recover to a primary state that existed just prior to a power outage. This recovery must incorporate appropriate security measures that guard against electronic tampering with the election results.

SUMMARY OF THE INVENTION

The present invention overcomes the problems that are outlined above by providing an state machine in the form of a precinct voting system that does not lose data in the event of a power outage to the station. The system permits a central computer a return to a primary state that existed just prior to a power outage, and the central computer does so without manual intervention. Security precautions are sufficient to preserve the integrity of election results.

The voting system includes a central processing unit, a network interface connection that couples the central processing unit with at least one voting station. The voting station provides the central processing unit with election data. A program storage memory is operably connected to the central processing unit, and contains program instructions for operation of the central processing unit in a configuration according to a selected one of a plurality of primary states. The program instructions include means for providing security protection prior to transferring from the selected primary state to another of the primary states. A flash memory cartridge is detachably connected to the central processing unit for the storage of election data. A nonvolatile flash memory is operably connected to the central processing unit for shadow backup storage of election data as the data is stored to said flash memory cartridge.

In preferred embodiments, the voting system includes means for returning the central processing unit to the selected primary state without manual intervention after a power outage has caused a demise in the primary state. This means can include an indicator variable for pointing to the selected primary state. A modem can be operably connected to the central processing unit for use in transmitting election canvass results from the central processing unit. Similarly, a printer can be operably connected to the central processing unit for providing a hardcopy printout of election canvass results. A single box preferably contains the central processing unit and at least a portion of the flash memory cartridge. A solenoid lock mechanism preferably engages the flash memory cartridge to prevent unauthorized removal of the flash memory cartridge from the box. The program instructions preferably require password authorization to the central processing unit prior to release of the solenoid lock and subsequent removal of the flash memory cartridge from the box.

Certain security precautions are particularly preferred for use in the present invention. The preferred security providing means include encryption and decryption algorithms for transmitting data, password protection for operator validation, and digital signatures for validating software components.

DETAILED DESCRIPTION OF PREFERRED EMBODIMENT

Figure 1:
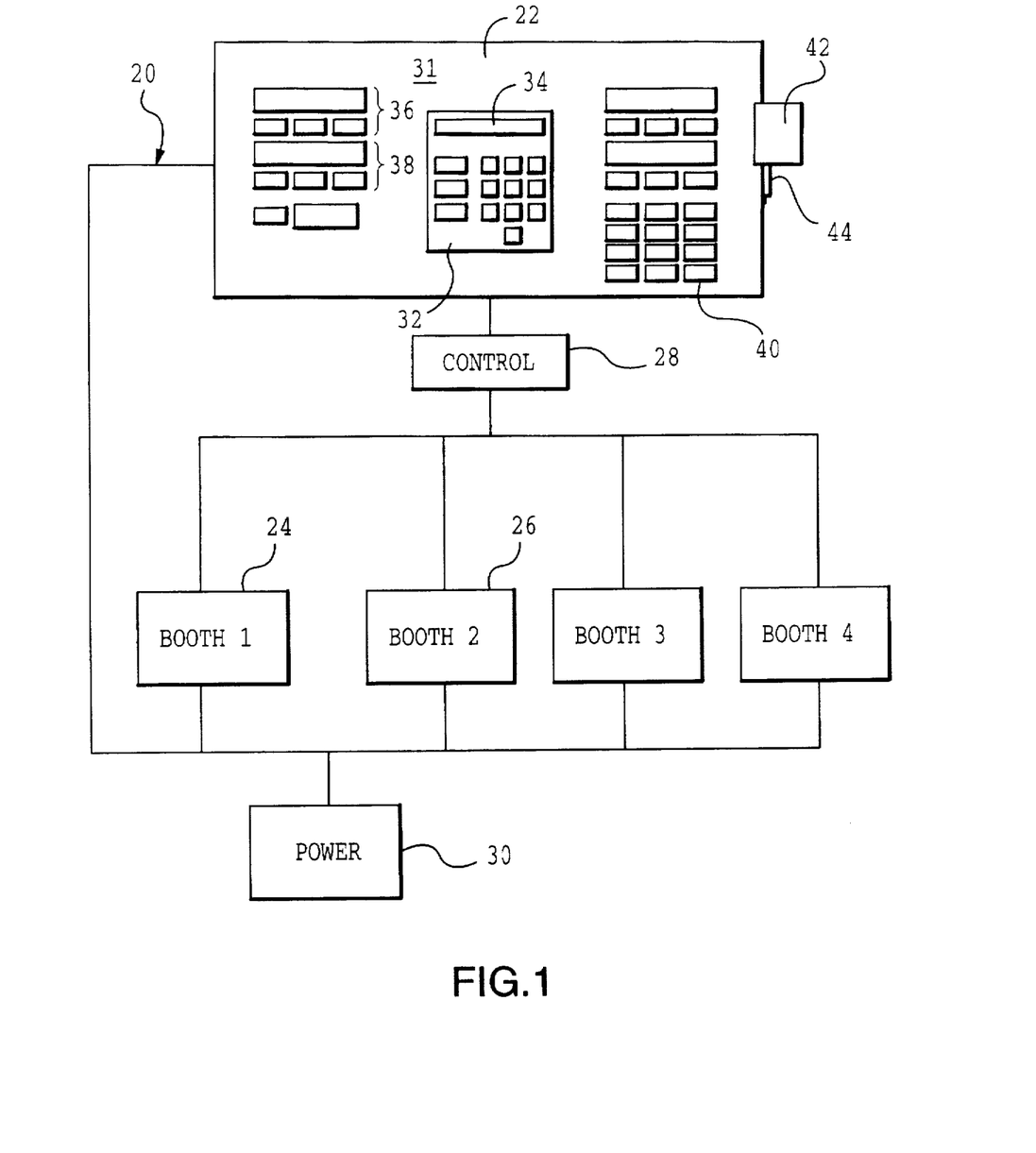
FIG. 1 depicts a schematic block diagram of a precinct voting system having a central judges' station according to the prevent invention.

FIG. 1 depicts precinct voting system 20. The major components of system 20 include a central judges' station 22; a plurality of voting booths, e.g., booths 24 and 26, which are networked to station 22; a controller 28 for operating the respective booths, and a power supply 30. Controller 28 is preferably contained within station 22, but can also wholly or partially reside in the respective voting booths.

Station 22 includes a central numeric keypad 32 with LCD readout 34. Station also includes a plurality of grouped booth operating features, e.g., features 36 for booth 24 and features 38 for booth 26. Station 22 also includes various process control buttons, e.g., buttons 40, for manual direction of the overall precinct-level election process. Flash memory cartridge is detachably connected to station 22 by insertion into a corresponding buss. Solenoid lock 44 serves to retain cartridge 42 in the inserted position until a release of cartridge 42 is authorized by controller 28.

Figure 2:
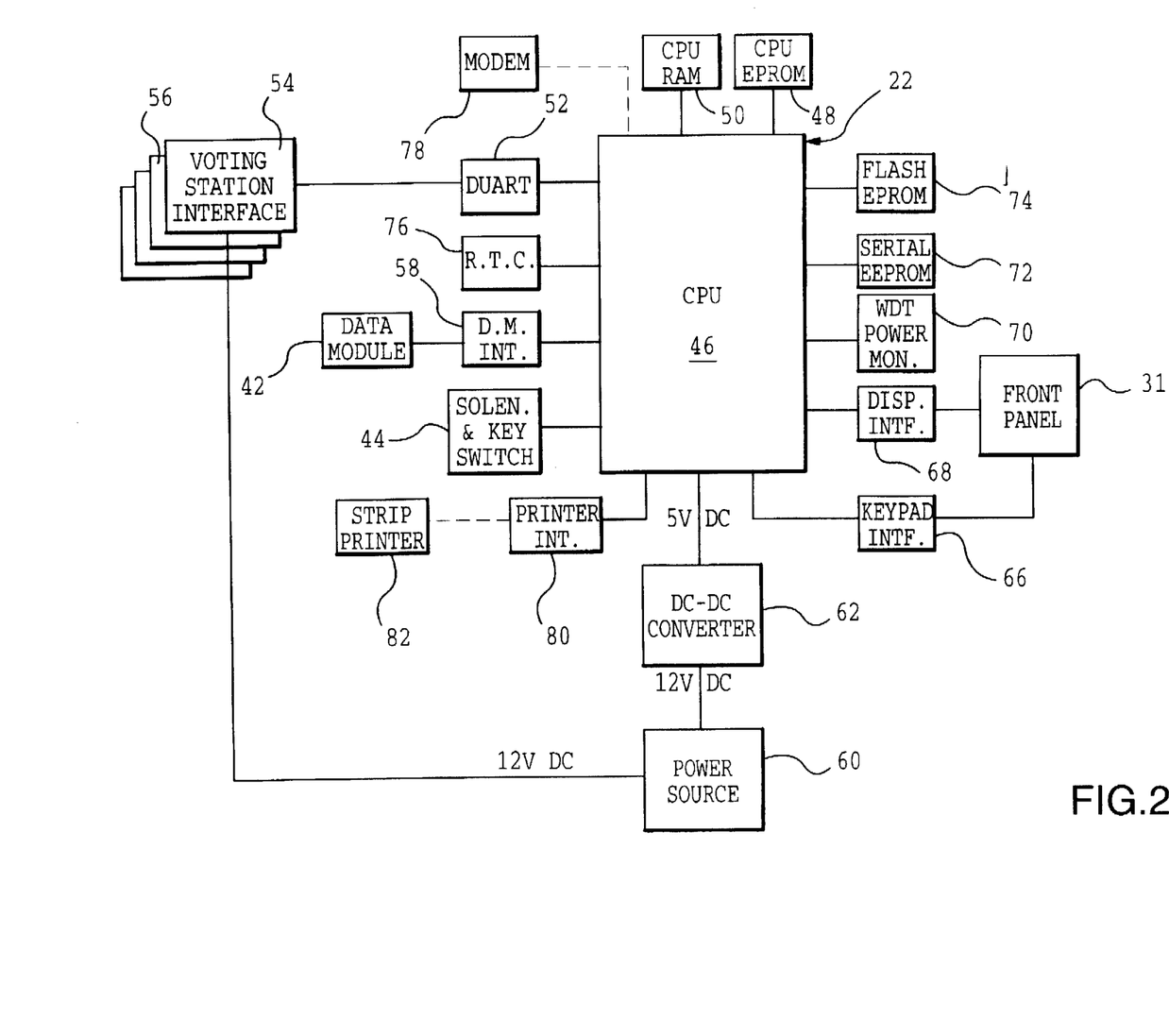
FIG. 2 depicts a block hardware diagram of a preferred judges' station.

FIG. 2 is a schematic block diagram that provides additional detail for various major hardware components of judges' station 22. The heart of the system is a central processing unit ("CPU") 46, e.g., a Motorola 68000 chip. CPU EPROM 48 contains program instructions for the operation of CPU 46. CPU 46 functions as controller 28 (FIG. 1) when CPU 46 is configured to operate under the program instructions in CPU EPROM 48. CPU RAM 50 is a relatively fast volatile memory that is accessed by CPU 50 for temporary storage of information, e.g., as a buffer for incoming data. Dual universal asynchronous real time connection 52 links CPU 46 with a plurality of voting station interfaces, e.g., interfaces 54 and 56. Data module interface 58 connects CPU 46 with a removable data module or flash memory cartridge 42. Solenoid lock 44 is actuated according to instructions received from CPU 46. A central power supply 60 provides a 12 V DC current for the operation of the respective voting stations through interfaces 54 and 56. Additionally, DC to DC converter 62 provides a 5 V power supply to CPU 46. The front panel 64 of station 22 as illustrated in FIG. 1 is connected to a keypad interface 66 for use in interpreting the status of depressible keypad buttons, and a display interface for interactive communication with the station operator.

Watchdog timer power monitor 70 is configured to detect a forthcoming interruption of power from source 60, and provides a signal to CPU 46 in the event that a power failure is forthcoming. Serial EEPROM 72 retains information including a unique serial number associated with station 22. Flash EPROM 52 is accessed by CPU 46 to store a shadow of the contents of flash memory cartridge 42. That is, CPU conducts write activities to flash memory module 42, and duplicates these write operations to flash EPROM 74. Real time clock 76 provides time information to CPU 46. This information can be used in analysis to track the volume of votes cast throughout an election day.

Other portions of FIG. 2 are preferably not part of station 22, but station 22 is provided with connections where these options may be attached. Modem 78 can link station 22 with a county administrative office that administrates several counties. Thus, the county administrative office can be apprised of real time election results. Printer interface connects CPU 46 with a printer 82 for use in producing a hardcopy of the election results in the form of a printed ballet with selections entered. The identity of a voter is never associated with ballot results of any kind, in order to preserve the requisite anonymity of voters.

Figure 3:
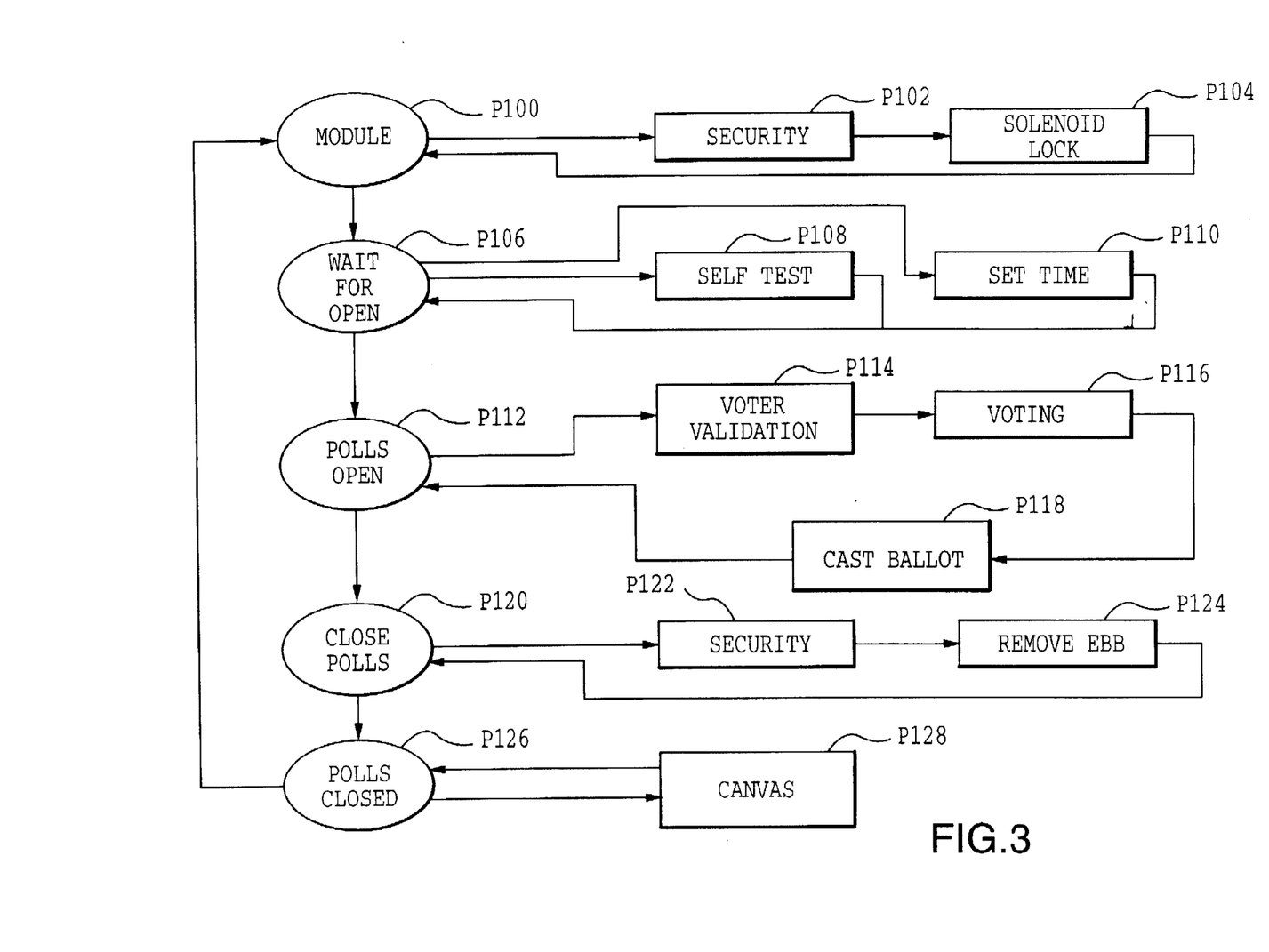
FIG. 3 depicts a generalized primary state machine diagram for use in controlling the FIG. 2 station in sequential stages during an election.

FIG. 3 depicts a generalized state machine diagram having a plurality of processing states that are identified to corresponding program control loops. State P100 is a state in which judging station 22 awaits the arrival of data module or cartridge 42. After a number of security measures including password protection and digital signature authorizations are performed in step P102, the operator engages solenoid lock 44 in step P104. Lock 44 stays engaged until the polls are closed.

State P106 includes various activities that are performed while the operator and CPU 46 wait for the polls to open. These procedures include a self test in step P108 during which the electronic components of system 22 are subjected to self-diagnostics. These diagnostics include cycling through the indicator lights, testing the various memory components of FIG. 2, and assuring that all of the voting booths are connected to the system. The operator can set the time, as needed, in Step P110. This time-setting feature permits the implementation of a chronological audit trail following the production of election data, as each cast ballot is stored with a time indicator.

In step P112, the operator opens the polls for voting. With the polls open, the voting cycle generally includes an initial voter validation step in P114. Step P114 can include the bar-code scanning of a voter registration card, alphanumeric keyed entry of the voter's identification, and even database retrieval of a voter picture to assist the operator in visually authenticating the voter's identity. In step P116, the voter enters a voting booth and begins depressing buttons that indicate his or her ballot choices. The voting process interacts with CPU 46 as sensory logic in the voting booth indicates that the status of a given button has changed, and communicates this information to CPU 46 for network interaction with the voter. Step P118 includes the voter depressing a CAST BALLOT button in the voting booth to transmit the ballot data to station 22 for appropriate storage in memory cartridge 42. An identical or backup copy of this election data is stored in flash EPROM 74. State P120 includes closing the polls at the conclusion of an election. Step P112 includes security authorization to prevent unauthorized closure. Step P124 includes removal of flash memory data module or cartridge 42. Flash memory cartridge 42 is subsequently hand-carried to a central administrative system that may be located in a county administrator's office. The removal of cartridge 42 in step P124 causes the polls to be closed in the final primary state P126. In state P126, CPU 46 accesses the election data from flash EPROM 74 to provide canvass results, i.e., preliminary voting results for that precinct. These results can be transferred via modem or printed out for analysis.

Each time CPU 46 enters into a new primary state in one of states P100, P106, P112, P120, or P126, a status variable indicator is written to a 60 byte segment of battery-backed RAM that is associated with realtime clock 76, or other nonvolatile memory. In the event of a power interruption, CPU 46 will restore to a given one of these primary states as indicated by the status variable in the RAM of realtime clock 76. Nevertheless, transitory data that has been entered in one of the control process loops associated with these primary states can be lost because the primary status is only restored to the entry level for each primary state. In primary state P112 (Polls Open), the ballot results are stored in nonvolatile memory as a ballot record each time a voter casts a ballot. Thus, cast ballot are not lost by a power interruption.

Figure 4:
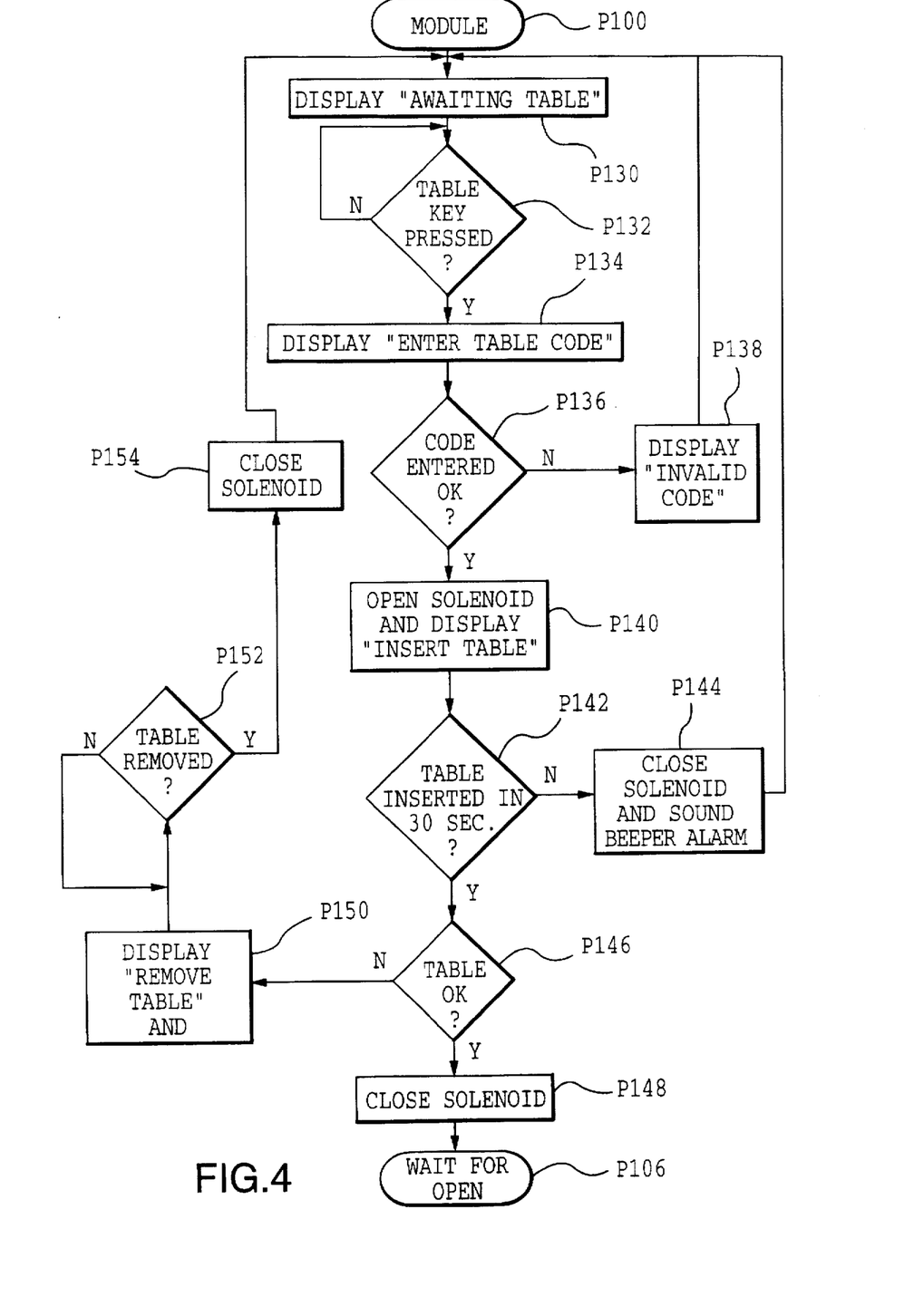
FIG. 4 depicts additional detail for use in a MODULE CONNECTION state of FIG. 3.

FIG. 4 depicts additional detail for the process control loop that is associated with module primary state P100. CPU 46 is initially turned on and receives program instructions from CPU EPROM 48. CPU 46 checks the status indicator variable stored in a segment of nonvolatile memory, e.g., flash memory 74, serial EEPROM 72, or the battery-fixed RAM associated with clock 76. Program control transfers to the primary state that is associated with the indicator variable. The initial power-on for each election will transfer program control to module primary state P100.

Upon entering module state P100, step P130 (through CPU 46) causes LCD display 34 to indicate "AWAITING TABLE." In this configuration, CPU 46 continually waits for the operator to depress a TABLE key on station 22 (see FIG. 1). This key indicates that the operator wants to install cartridge 22. At this stage, cartridge 22 will contain a table of data that is accessed by station 22 to conduct the election. Once the operator depresses the TABLE key, program control exits the loop constituting step P132, and transfers to step P134. In step P134, LCD display 34 reads "ENTER TABLE CODE." This table code is specific to the particular data cartridge 42 that is supposed to be used with judging station 22. Only the operator will be provided with this code.

In step P136, the operator-entered table code is compared to a code that resides in a specific location within cartridge 42. The entered code is checked against the stored code in the module. If the codes fail to match, step P138 causes LCD display 34 to read "INVALID CODE," and control is returned to step P130. On the other hand, if CPU 46 determines that the codes match in step P136, control passes to step P140.

In step P140, CPU 46 causes solenoid lock 44 to open, and LCD display 34 reads "INSERT TABLE." In step P142, CPU 46 waits for 30 seconds, then checks to ascertain whether cartridge 42 is installed in appropriate bus. Step P144 includes closing solenoid lock 44 and sounding an alarm when data module 42 has not been inserted. On the other hand, if the data module has been inserted within the 30 second limit of step P142, control passes to step P146.

In step P146, CPU 46 runs a diagnostic check to ascertain whether the table of information contained in cartridge 42 is acceptable. This checking includes accessing a serial number in cartridge 42, performing a checksum calculation to verify proper contents within cartridge 42, and converting these values to numerical values that are used in a mathematical calculation. The result of the calculation is called a digital signature. An identical calculation is performed at a precinct administrator's station, and a comparative signature is stored in cartridge 42. The results at station 22 are checked against the stored value in cartridge 42. If the values match, control passes to step P148, which closes solenoid lock 44 to lock cartridge 42 in place for the duration of the precinct election.

At this time, cartridge 42 includes a data table that identifies a specific ballot structure to system 22. System 22 utilizes this stored data to configure itself for that particular ballot. This information is stored in one of flash EPROM 74 or serial EEPROM 72. The data contents of cartridge 42 are subsequently erased to make available additional room for the storage of election data. Once this erasure is completed, cartridge 42 is referred to as an electronic ballot box ("EEB"). At the conclusion of step P148, control passes to primary state P106. In state P106, CPU 46 awaits the opening of the polls.

In step P146, it is possible that the digital signature values will fail to match. In this event, control passes to step P150, which causes LCD display 34 to read "REMOVE TABLE." Step P152 subsequently checks to ascertain whether cartridge 42 has been removed. If cartridge 42 has been removed, control passes to step P154, which closes solenoid lock 44, and returns control to step P130.

Figure 5:
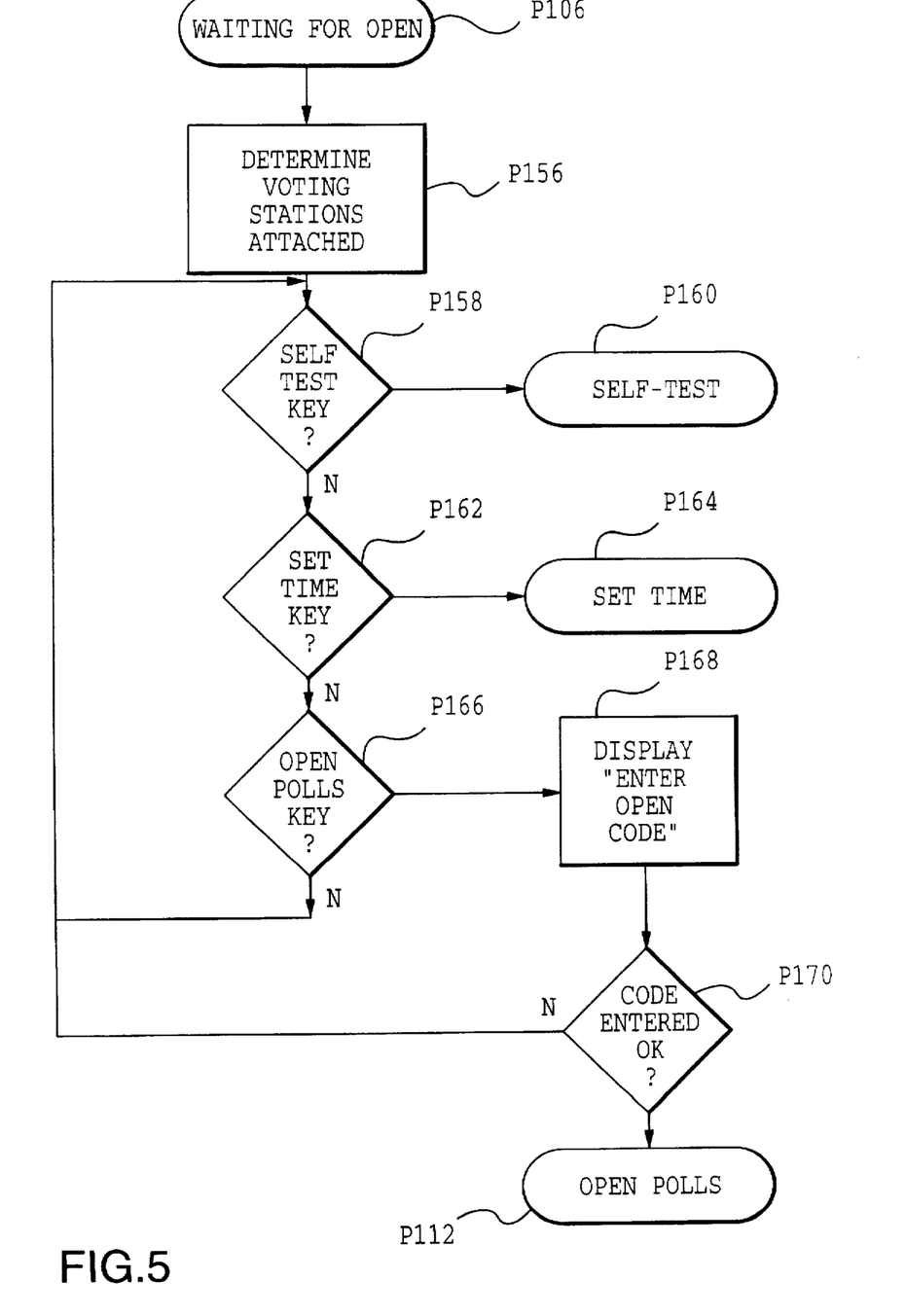
FIG. 5 depicts additional detail for use in a WAITING FOR OPEN state of FIG. 3.

FIG. 5 depicts additional detail for the control process loop that is associated with waiting for open primary state P106. In step P156, CPU 46 accesses connection 52 to determine how many voting stations, e.g., stations 54 and 56, are attached to station 22.

Step P158 includes constantly checking for the operator to depress a self-test key. This key is one of keys 40, as indicated in FIG. 1. Once the self-test key has been pressed, step P160 includes a self-test procedure that assures system 20 is in good working order. This self-test includes the use of all network connections to assure that all of the devices are properly attached, cycling through all of the selection indicator lights within booth 54 and other booths, conventional ROM and RAM testing, and other conventional self-test procedures.

In step P162, station 22 checks to ascertain whether the operator has depressed a SET TIME key. The SET TIME key is one of keys 40 on station 22. If this key is depressed, control passes to step P164, which prompts the operator to set the time.

In step P166, CPU 46 checks to ascertain whether a POLLS OPEN key has been depressed. The POLLS OPEN key is one of keys 40 on station 22. If this key is depressed, control passes to step P168, which causes LCD display 34 to read "OPEN CODE." In step P170, the operator-entered open code is compared against a similar value that was obtained from cartridge 42. This value from cartridge 42 may at this time have been transferred to flash EPROM 74 or serial EEPROM 72. If the codes are an identical match, control passes to primary state P112 and the polls are opened.

In step P170, the codes may not match. Control then returns to step P158 and the loop including steps P158, P162, and P166.

Figure 6:
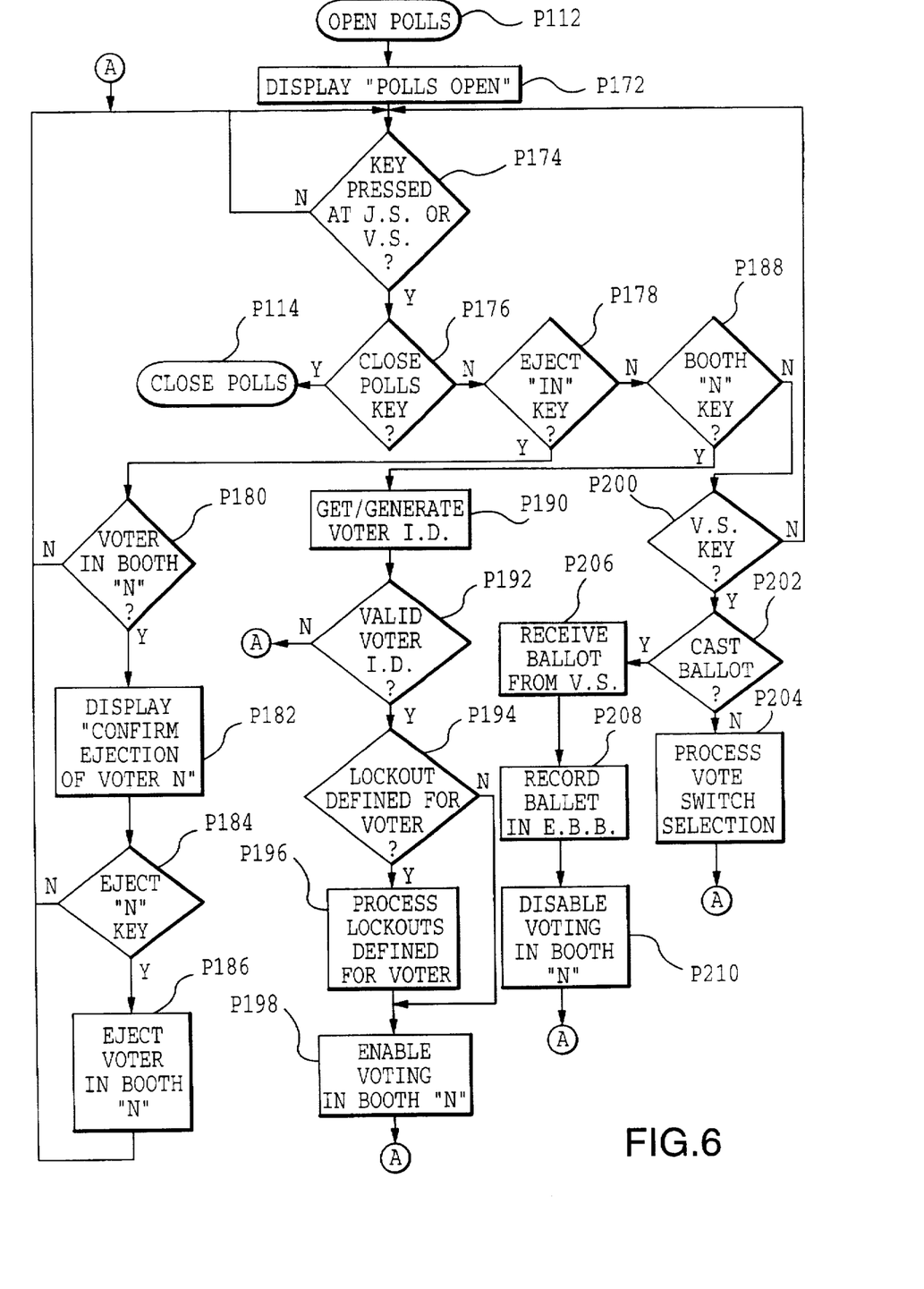
FIG. 6 depicts additional detail for use in a OPEN POLLS state of FIG. 3.

FIG. 6 depicts a control process loop that is associated with primary state P112. Step P172 initially causes LCD display 34 to read "POLLS OPEN." In step P174, CPU 46 waits to ascertain whether a key has been depressed at station 22 or one of the voting booths, e.g., booths 54 and 56. Once CPU 46 determines that a key has been depressed, CPU 46 makes a series of determinations as to which key was depressed. In step P176, CPU 46 checks to determine whether the CLOSE POLL key was depressed. This key is one of keys 40 as depicted in FIG. 1. If the CLOSE POLL key was depressed, control passes to primary state P120, namely, a closed polls state.

If the CLOSE POLLS key was not depressed, step P178 checks to determine whether an eject "N" key was depressed. This key is one of keys 40 as depicted in FIG. 1. In this context, the "N" refers to a voter in booth N. If the "N" was depressed, step P180 checks to determine whether a voter is in booth N. If no voter is in booth N, as indicated by the status of a cast ballot button in the booth, control passes to step P147. On the other hand, a voter may be in booth N. If so, step P182 causes LCD display 34 to read "CONFIRM EJECTION OF VOTER N." Step P184 subsequently checks to ascertain whether the eject n key has been depressed a second time. If the key is not depressed within 5 seconds, control passes to step P174 without ejecting the voter in booth N. In step P184, if the eject N key is depressed within the allotted time, the voter in booth N is ejected, and will no longer be permitted to vote. Control subsequently passes to step P174.

Step P188 checks to ascertain whether a booth "N" key has been depressed. This key is one of keys 40 of station 22 as depicted in FIG. 1. If the booth "N" key has been depressed, step P190 entails the generation of a voter identification parameter. This parameter can include a keypunch entry of the voter's Social Security number or name, or can include the scanning of a bar code on the voter's registration card. Step P192 includes checking the voter identification parameter to determine whether the voter is a valid voter who is authorized to participate in the election at hand. Step P192 may be performed by hand by the election judge or other official, but is preferably done by computer. A table including valid voters can be stored within cartridge 42 prior to its erasure for use as an electronic ballot box, or other storage means can be used. If the voter identification obtained in step P190 does not match a voter identification that is found within a lookup table of authorized voter identifications, control passes to step P174 along avenue A as indicated in FIG. 6. The lookup table of voter identifications that was accessed in step P192 includes a lockout identifier. In step P194, this lockout identifier is used to configure a voting both, e.g., booth 54, for this particular voter. For example, the voter may be voting in a city precinct, but the voter may himself live in an unincorporated portion of the county. Therefore, the voter would be authorized to vote in state and federal elections at this precinct, but would be locked out or precluded from voting in municipal elections.

In step P196, the voter lockout parameter obtained from step P194 is processed to configure the booth for a particular voter. Step P198 includes configuring a booth, e.g., booth 54, with the configuration derived from step P196. The booth is then enabled for interaction with CPU 46 as the voter enters in ballot selections and finally casts a ballot.

Returning now to step P188, it is possible that the booth "N" key will not be depressed. In this case, control passes to step P200, which ascertains whether a voting station key has been depressed. This voting station key will be one of the groups such as 36 and 38 as depicted in FIG. 1. If the voting station key has not been depressed, control returns to step P174 for repetition of the loop including steps P174, P176, P178, P188, and P200. If the voting station key has been depressed, CPU 46 in step P202 checks to determine whether a cast ballot key has been depressed in a voting station. If not, CPU 46 interacts with the voter to permit the voter to select all of the appropriate ballot selections in step P204.

If the cast ballot key is depressed in step P202, step P206 includes CPU 46 receiving a ballot from the voting station. This ballot is preferably encrypted at the corresponding voting station and deencrypted at CPU 46. It is preferred to use any variety of standard encryption protocols. A class of these protocols that is particularly preferred include the "secure hash algorithms." A secure hash algorithm is available from the National Institute of Standards and Technology.

In step P208, CPU 46 records the ballot as data in the electronic ballot box, which is cartridge 42. After the information is recorded, step P210 includes disabling voting booth N that originated the ballot that was just stored.

Figure 7:
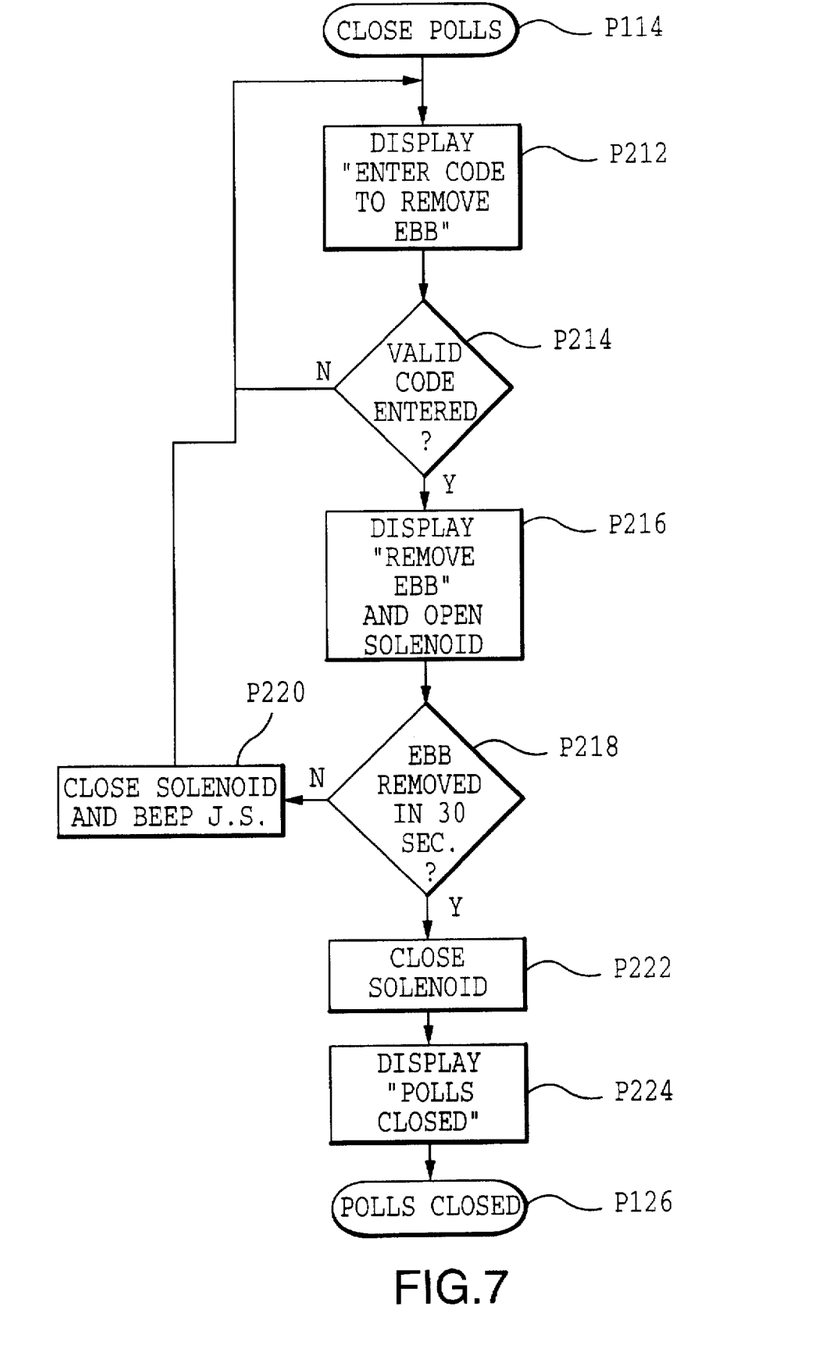
FIG. 7 depicts additional detail for use in a CLOSE POLLS state of FIG. 3.

FIG. 7 depicts additional detail for the control process loop that is associated with the close polls primary state P120. In step P212, CPU 46 causes LCD display 34 to enter "ENTER CODE TO REMOVE EBB." The operator then enters in an appropriate code on keypad 32 of station 22 (see FIG. 1). Step P214 includes checking the operator-entered code against a valid code for the removal of cartridge 42 by CPU 46. This valid code can be originally provided to station 22 from cartridge 42. The code can subsequently be transferred and stored for later retrieval in one of flash EPROM 74 or serial EEPROM 72. If the operator-entered code is not a valid code for causing the removal of cartridge 42, control returns to step P212. On the other hand, if the code is valid, step P216 causes LCD display 34 to read "REMOVE EBB." Step P216 also causes solenoid lock 44 to disengage from cartridge 42. In this configuration, cartridge 44 can be removed from station 22.

Step P218 includes CPU 46 waiting for 30 second to check whether cartridge 42 has actually been removed. If cartridge 42 has not been removed, control passes to step P220, which closes solenoid 44 for locking engagement with cartridge 42, and an alarm sounds at station 22. If step P218 determines that cartridge 42 has been removed, step P222 includes the closing of solenoid 44 to prevent the insertion of yet another cartridge like cartridge 42. Step P224 subsequently causes LCD display to read "POLLS CLOSED." Control then passes to primary state P126, i.e., the polls are closed.

Figure 8:
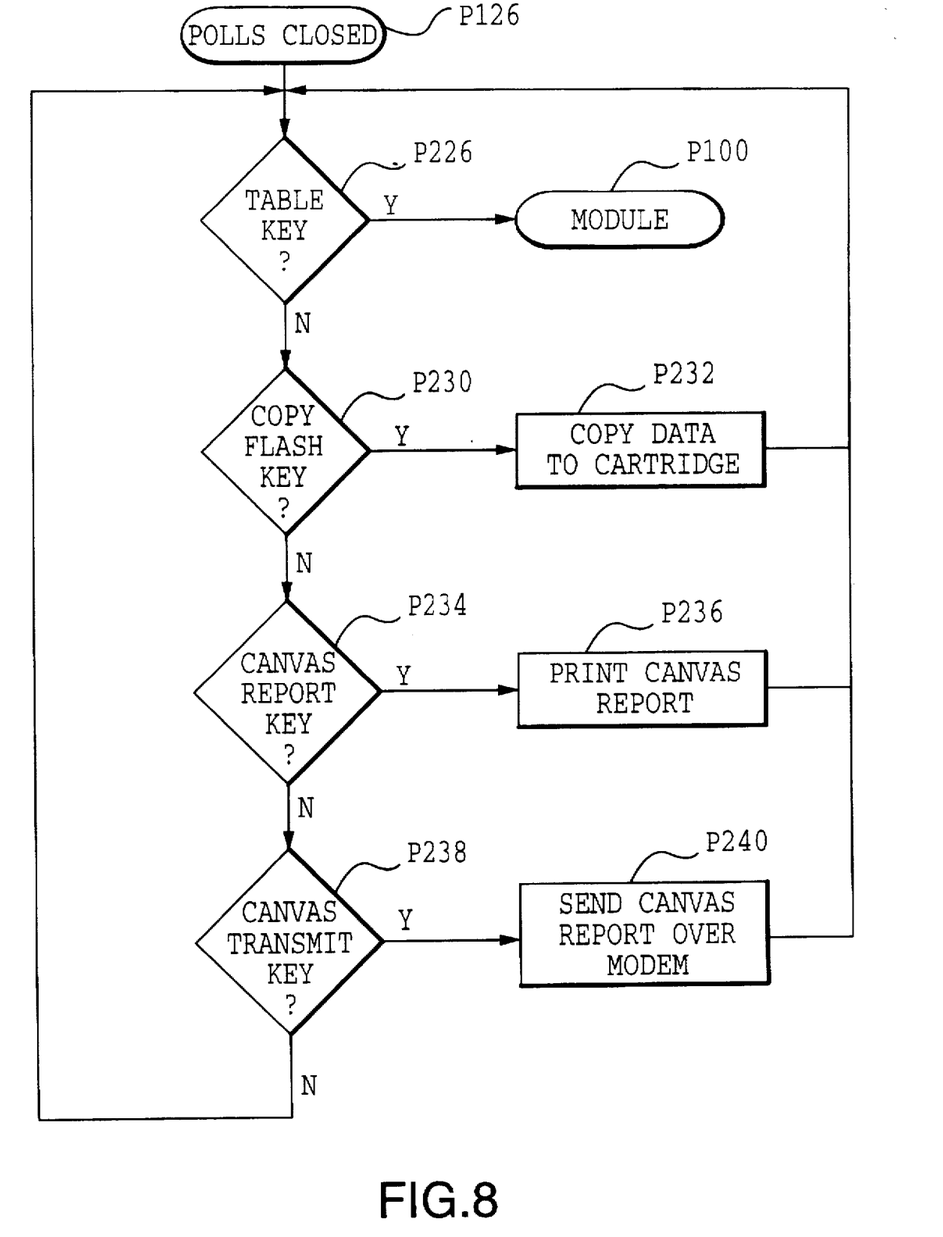
FIG. 8 depicts additional detail for use in a POLLS CLOSED state of FIG. 3.

FIG. 8 depicts additional detail for the control process loop that is associated with the polls closed primary state P126. In step P226, CPU 46 determines whether a table key has been depressed at station 22. This key will be one of keys 40 as depicted in FIG. 1. If the table key is depressed, control passes to module primary state P100 for the insertion of a new data cartridge 42. If the table key is not depressed, step P230 includes ascertainment of whether a copy flash key has been depressed at station 22. The copy flash key will be one of keys 40 as depicted in FIG. 1. If the copy flash key is depressed, step P232 causes CPU 46 to commence copying of the data from flash EPROM 74 to a new cartridge inserted in place of cartridge 42. Step P232 is particularly useful in the event that cartridge 42 fails or is destroyed in transit between the precinct voting station and the county administrator's station.

If the copy flash key is not depressed in step P230, step P234 includes ascertaining whether a canvass report key has been depressed at station 22. The canvass report key will be one of keys 40 as depicted in FIG. 1. If the canvass report key is depressed, step P236 includes CPU 46 causing a canvass report to be printed on strip printer 82. This canvass report can provide intermediate election results at the voting precinct level. This printed copy is also a backup copy of the election results for that precinct.

In the event that the canvass report key is not depressed in step P234, step P238 includes checking to ascertain whether the canvass transmit key has been depressed at station 22. The canvass transmit key is one of keys 40 depicted in FIG. 1. In step P240, CPU 46 causes a canvass report to be sent from CPU 46 to another destination through modem connection 78. In this manner, intermediate election results can be posted to various press agencies, or a county administrator's unit.

It will be appreciated that each of primary states P100, P106, P112, P120, and P126 require a substantial number of intermediate steps before process control can be transferred between successive memory states. In the event that a power interruption occurs during an election, a significant amount of time would be required to restore system 20 to the primary state that existed immediately prior to the power outage. This circumstance is avoided by the storage of a status indicator variable in the battery-backed up RAM of realtime clock 76. The CPU 46, after being provided with control instructions from CPU EPROM 48, checks this status indicator prior to entering module state P100. Thereafter, CPU 46 returns to a selected primary state indicated by the status indicator variable. This primary state will most likely be primary state P112, which exists throughout the day when the polls are open. A given voter in booth "N" may have to be revalidated and reauthorized for voting if the power outage, having lost the indicated selections prior to actually casting a ballot. Alternatively, the status of the voting station can be saved to flash EPROM 74 every time a button is depressed. This instantaneous saving feature would make possible the restoration of the voting booth to the status that existed immediately prior to the power outage.

Each primary state is associated with a security control feature, such as password protection and digital signature. The use of digital signature, including a checksum memory calculation and a device-specific hardware serialization number as input to a complex algorithm is particularly preferred. It is especially preferred to provide this digital signature protection for cartridge 42, as well as each one of the voting stations that are connected to station 22, such as those that are connected through interfaces 54 and 56. This digital signature will permit only authorized voting stations and cartridges to be used with a particular station 22. This digital signature is preferably checked as part of step P200. Station 22 will, accordingly, accept only input from an authorized voting station that has passed these security precautions. The chances of election fraud are, accordingly, reduced by limiting the ability of station 22 to recognize redundant hardware components. For example, it becomes impossible for an unauthorized person to cut a connection between a voting booth and station 22 and, thereafter, connect the cut lead to a duplicate voting station that would interact with CPU 46. This type of interaction would be prevented by CPU only recognizing input from voting stations that have an appropriate digital signature. Therefore, it is preferred for CPU 46 to check this digital signature in step P206 in FIG. 6 every time a ballot is cast.

Those skilled in the art will understand that the preferred embodiments, as hereinabove described, may be subjected to apparent modifications without departing from the true scope and spirit of the invention. Accordingly, the inventors hereby state their intention to rely upon the Doctrine of Equivalents, in order to protect their full rights in the invention.

We claim:

1. A voting system for use in elections, comprising:
   a central processing unit for communicating with voters at a plurality of voting stations during an election;
   a network interface means for connecting, during an election, said central processing unit with said plurality of voting stations to provide said central processing unit with election data as voters make voting choices at said voting stations;
   a program storage memory operably connected to said central processing unit and containing program instructions for operation of said central processing unit in a configuration according to a selected one of a plurality of primary operating states, said program instructions including means for providing security protection prior to transferring from said selected one state to another of said plurality of states, each of said states corresponding to a different stage of conducting an election;
   a flash memory cartridge detachably connected to said central processing unit for storage of said election data; and
   a nonvolatile flash memory operably connected to said central processing unit for shadow storage of said election data as stored to said flash memory cartridge.

2. The system as set forth in claim 1, said program instructions including means for returning said central processing unit to said selected one of said primary states without manual intervention after a power outage has caused a demise in said selected one of said primary states.

3. The system as set forth in claim 2, said means for returning including indicator variable storage means for pointing to said selected one of said primary states.

4. The system as set forth in claim 1, including a modem operably connected to said central processing unit for use in transmitting election canvass results from said central processing unit.

5. The system as set forth in claim 1 including a printer operably connected to said central processing unit for providing a hardcopy printout of election canvass results.

6. The system as set forth in claim 1 including a single box containing said central processing unit and at least a portion of said flash memory cartridge.

7. The system as set forth in claim 6, said box including a solenoid lock mechanism engaging said flash memory cartridge to prevent unauthorized removal of said flash memory cartridge from said box.

8. The system as set forth in claim 1, said program instructions requiring password authorization to said central processing unit prior to release of said solenoid lock and subsequent removal of said flash memory cartridge from said box.

9. The system as set forth in claim 1, said means for providing security protection including a decryption algorithm for interpreting results from said voting stations.

10. The system as set forth in claim 1, said flash memory cartridge including data for use by said program instructions in configuring said plurality of voting stations for a particular election.

11. The system as set forth in claim 1, said means for providing security protection including password protection.

12. The system as set forth in claim 1, said means for providing security protection including a digital signature.

13. The system as set forth in claim 1, said selected one of said primary states including a module connection state, a waiting for open state, a polls open state, a close polls state, and a polls closed state.

14. The voting system of claim 1, wherein:
   said plurality of operating states includes a module state in which said central processing unit operates prior to locking of said memory cartridge with said single unit, a waiting for open state in which said central processing unit operates after said module state and before opening of polls for voting, a polls open state in which said central processing unit operates after said waiting for open state and when polls are open for voting, and a close polls state for closing the polls to voting after the polls open state;
   said first operating state comprises one of said module state, said waiting for open state and said polls open state; and
   said second operating state comprises one of said waiting for open state, said polls open state and said close polls state.

15. An electronic voting system for use in elections, the system comprising:
   a central station for controlling operation of a plurality of electronic voting stations during an election and for communicating with voters at said voting stations as voting decisions are made by said voters at said voting stations, said central station including, in a single unit:
(i) a central processing unit for communicating with and controlling operation of said voting stations during an election;
(ii) a network interface for connecting said central processing unit with said voting stations, permitting said central processing unit to communicate with and control operation of said voting stations during an election;
(iii) a detachable memory cartridge operably connected with said central processing unit for storing said election data received from said voting stations during an election, said detachable memory cartridge being removable from said central station for transporting said election data to a location remote from said central station for tabulation;
(iv) nonvolatile memory operably connected with said central processing unit for shadow storage of said election data; and
(v) program storage memory operably connected with said central processing unit and containing program instructions for operating said central processing unit in different ones of a plurality of operating states, each of said operating states corresponding with a different stage of conducting an election, there being at least a first operating state and a second operating state in which said central processing unit cannot operate without first having operated in said first operating state, there being a security requirement for defined steps to occur prior to initial transfer during an election from operation of said central processing unit in said first operating state to operation of said central processing unit in said second operating state;
wherein, when operation of said central processing unit in said second operating state prematurely ceases during an election due to a power interruption, said voting station is capable, after said power interruption, of returning said central processing unit to operation in said second operating state without requiring that said central processing unit first operate, after said power interruption, in said first operating state.

16. The voting system of claim 15, wherein:
the voting system comprises a first memory, other than said program storage memory, said flash memory cartridge and said nonvolatile flash memory;
prior to said power interruption, said central processing unit writes to said first memory a status variable indicator indicating that operation of said central processing unit is in said second operating state;
during said power interruption, said first memory retains said status variable indicator; and
after said power interruption, said central processing unit is returned to said second operating state according to said status variable indicator.

17. The voting system of claim 16, wherein:
said first memory is nonvolatile.

18. The voting system of claim 16, wherein:
said first memory comprises battery-backed RAM.

19. The voting system of claim 15, wherein:
said first operating state is a waiting for open state corresponding with a stage in an election following attachment of said memory cartridge in said single unit and preceding opening of polls for voting; and
said second operating state is a polls open state corresponding with a stage in an election, following said waiting for open state, when polls are open for voting.

20. The voting system of claim 19, wherein:
said detachable cartridge, at the time of said attachment of said memory cartridge in said single unit, includes a first code; and
said defined steps for initial transfer of said central processing unit from operation in said first operating state to operation in said second operating state requires an operator to input a second code matching with said first code.

21. The voting system of claim 19, wherein:
during processing in said first operating state, said central processing unit performs a self-diagnostic test of electrical components of the voting system, prior to initial transfer from operation of said central processing unit from said first operating state to said second operating state.

* * * * *